United States Patent
Bostick et al.

(10) Patent No.: US 10,321,406 B2
(45) Date of Patent: Jun. 11, 2019

(54) CONTEXTUALLY SWITCHING FROM A WIRELESS COMMUNICATION TO HUMAN BODY NEAR-FIELD COMMUNICATION FOR POWER SAVINGS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/437,548

(22) Filed: Feb. 21, 2017

(65) Prior Publication Data
US 2018/0242254 A1  Aug. 23, 2018

(51) Int. Cl.
*H04W 52/02* (2009.01)
*H04W 4/02* (2018.01)
*H04B 13/00* (2006.01)

(52) U.S. Cl.
CPC ...... *H04W 52/0251* (2013.01); *H04B 13/005* (2013.01); *H04W 4/023* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/146* (2018.01); *Y02D 70/164* (2018.01);
(Continued)

(58) Field of Classification Search
None
See application file for complete search history.

(56) References Cited

U.S. PATENT DOCUMENTS

| | | |
|---|---|---|
| 5,796,827 A | 8/1998 | Coppersmith et al. |
| 7,633,076 B2 | 12/2009 | Huppi et al. |

(Continued)

OTHER PUBLICATIONS

Azevedo, T. (2015). BodyCom™ Technology—Development Kit; MicroChip Technologies. YouTube. Retrieved at: https://www.youtube.com/watch?v=clkaQYNcB5U.
(Continued)

*Primary Examiner* — Mohammed Rachedine
(74) *Attorney, Agent, or Firm* — Cantor Colburn LLP; Brian Restauro (57) ABSTRACT

Embodiments include techniques for contextual switch from a wireless communication to human body near-field communication for power savings, the technique includes determining, via a processor, a configuration of devices for a user, the devices include wearable devices and mobile devices. The techniques include identifying a cluster of the devices, and determining a current activity and location of the user based on an indication from at least one of the devices. The techniques also include determining a proximity of the devices to the user, and based on the current activity, the location, and the proximity of devices, switching one or more connections to of the devices from a wireless communication technology to a human body near-field communication. The techniques include storing the configuration and the activity of the user.

15 Claims, 6 Drawing Sheets

(52) U.S. Cl.
CPC ............ *Y02D 70/166* (2018.01); *Y02D 70/20* (2018.01); *Y02D 70/26* (2018.01)

(56) References Cited

U.S. PATENT DOCUMENTS

| | | | |
|---|---|---|---|
| 2009/0275293 A1* | 11/2009 | Ida | H04B 13/005 455/73 |
| 2011/0299512 A1* | 12/2011 | Fukuda | G06F 1/163 370/338 |
| 2013/0231046 A1 | 9/2013 | Pope et al. | |
| 2014/0295757 A1* | 10/2014 | Kubota | H04N 5/232 455/41.1 |
| 2015/0358088 A1* | 12/2015 | Eim | H04W 76/14 455/418 |
| 2017/0093882 A1* | 3/2017 | Khuu | H04L 63/12 |

OTHER PUBLICATIONS

MicroChip Technologies & Jasio, L (2013). Microchip's BodyCom technology is world's first to use the human body as a communication channel. YouTube. Retrieved at: https://www.youtube.com/watch?v=DJh1n2B4MAU.

Zimmerman, T. G., "Personal Area Networks: Near-field Intrabody communication", IBM Systems Journal, 35, (3-4), 1996, 9 pages.

\* cited by examiner

CONTEXTUALLY SWITCHING FROM A WIRELESS COMMUNICATION TO HUMAN BODY NEAR-FIELD COMMUNICATION FOR POWER SAVINGS

BACKGROUND

The present invention relates to wireless communication systems, and more specifically, to contextual switch from a wireless communication to human body near-field communication for power savings.

In today's environment, with the increase in wearable technology and mobile devices, wireless communication is used to increase the mobility of its users. The wireless communications include Bluetooth, WiFi, near-field communication (NFC), and other technologies. The different technologies have different transmission characteristics, bandwidths, and consume varying amounts of power based on the resources used and general overhead associated with the wireless communication technology.

In one or more scenarios, a user can manually select the different types of wireless communications to conserve power. For instance, a WiFi connection can be selected over a cellular provider's service or in another instance, a Bluetooth connection can be selected over a WiFi connection to conserve power. The connections can be switched to conserve the limited resources of each of the connected devices.

SUMMARY

According to an embodiment, a method for contextually switching from a wireless communication to human body near-field communication for power savings is provided. The method includes determining, via a processor, a configuration of devices for a user, the devices include wearable devices and mobile devices. The method includes identifying a cluster of the devices, and determining a current activity and location of the user based on an indication from at least one of the devices. The method also includes determining a proximity of the devices to the user, and based on the current activity, the location, and the proximity of devices, switching one or more connections of the devices from a wireless communication technology to a human body near-field communication. The method includes storing the configuration and the activity of the user.

According to another embodiment, a system for contextually switching from a wireless communication to human body near-field communication for power savings, the system including a storage medium where the storage medium being coupled to a processor is provided. The processor configured to determine a configuration of devices for a user, the devices include wearable devices and mobile devices, and identify a cluster of the devices. The processor is also configured to determine a current activity and a location of the user based on an indication from at least one of the devices, and determine a proximity of the devices to the user. The processor is configured to switch one or more connections of the devices from a wireless communication technology to a human body near-field communication based on the current activity, the location, and the proximity of the devices, and store the configuration and the activity of the user.

According to a different embodiment, a computer program product for contextually switching from a wireless communication to human body near-field communication for power savings, where the computer program product includes a computer readable storage medium having stored thereon first program instructions executable by a processor is provided. The instructions are executable to cause the processor to determine a configuration of devices for a user, the devices include wearable devices and mobile devices, and identify a cluster of the devices. The instructions are further executable to cause the processor to determine a current activity and a location of the user based on an indication from at least one of the devices, and determine a proximity of the devices to the user. The instructions are executable to cause the processor to switch one or more connections of the devices from a wireless communication technology to a human body near-field communication based on the current activity, the location, and the proximity of the devices, and store the configuration and the activity of the user.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for a contextually switching from a wireless communication to a human body near-field communication for power savings.

As clusters of devices are used in combination with one another, a computing system can learn and store the configurations of the devices and applications that are commonly used together. In an example, a non-exhaustive list of wearable devices includes smartwatches, electronic textile clothing, electronic tattoo, electronic bracelet, ring devices, mobile phones, and the like. Wearable technology includes a variety of modules for GPS, detecting motion, sensing biometric data, and the like. As a non-limiting set of examples, the applications include fitness applications, audio and music applications, social media applications, streaming applications, etc. The user activities can be associated with each respective cluster of devices. The user activities can include exercising, working, commuting, etc.

As the computing system discovers and learns the different clusters of devices, the location of the user, active applications, and proximity of the devices, the computing system can use the collected information to switch one or more eligible connections to the near-field communications to conserve power. When an identified cluster of devices is subsequently operated together, the computing system can detect the scenario and automatically configure the connections based on the previous configuration. In a different embodiment, the connections used between the devices can be switched based on detecting a configuration of devices from a power intensive connection such as a WiFi or Bluetooth connection to a less power intensive connection such as human body near-field communication to conserve power.

The mobile devices and wireless technology are battery powered devices having a limited supply of energy. As devices can use multiple connections a greater demand is placed on the power source of each connected device. In some instances, devices can simultaneously use multiple connection types such as using Bluetooth and WiFi. A technique is described herein to switch connection types to a less power intensive connection based on various learned patterns and factors.

Figure 1:
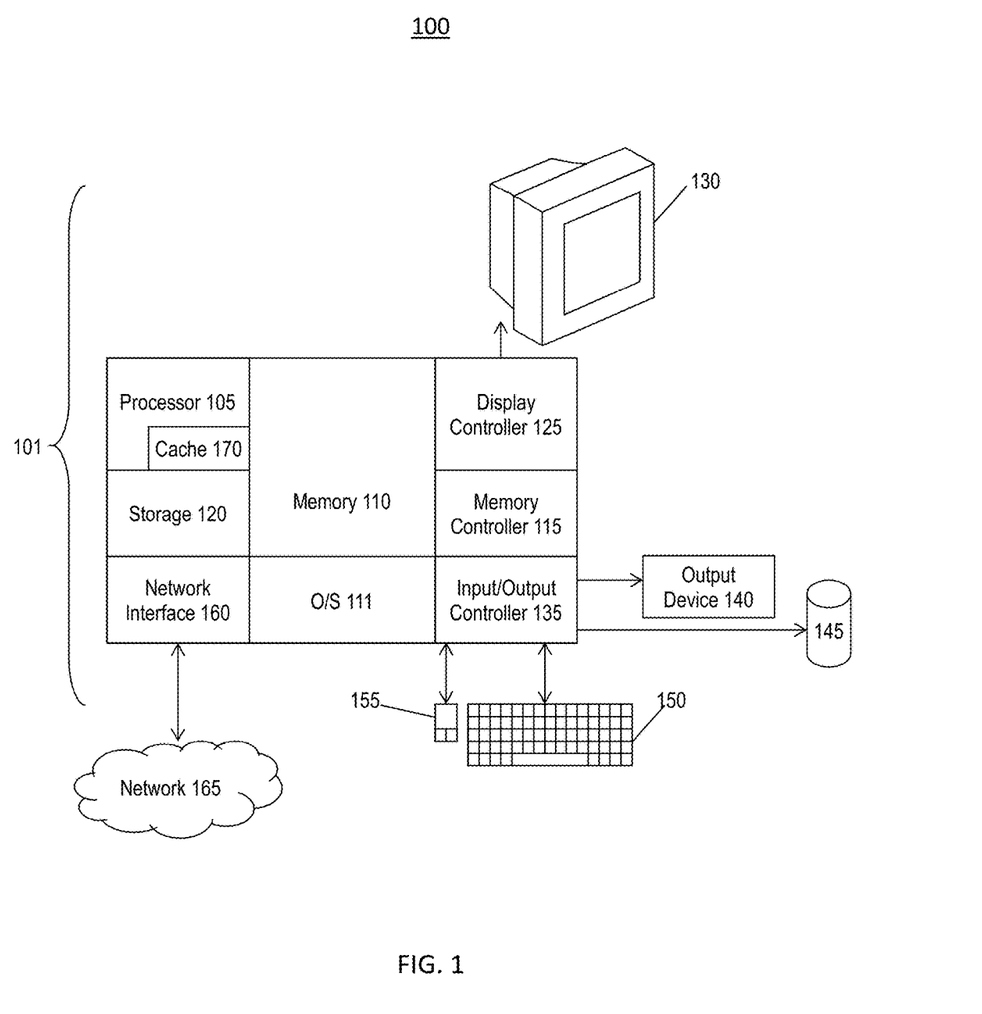
FIG. 1 is a block diagram illustrating one example of a processing system for practice of the teachings herein.

In an exemplary embodiment, in terms of hardware architecture, as shown in FIG. 1, the computer 101 includes a processor 105. The computer 101 further includes memory 110 coupled to a memory controller 115, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in storage 120, such as cache storage, or memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another but can be accessed by the processor 105.

The instructions in memory 110 may include one or more separate programs, each of which comprises an ordered listing of executable instructions for implementing logical functions. The instructions in the memory 110 a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example, but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or another similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. Other networks include body area networks (BAN) where the electric field of a human body can be used to transmit signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to fetch and execute instructions stored within the memory 110, to communicate data to and from the memory 110, and to generally control operations of the computer 101 pursuant to the instructions.

Figure 5:
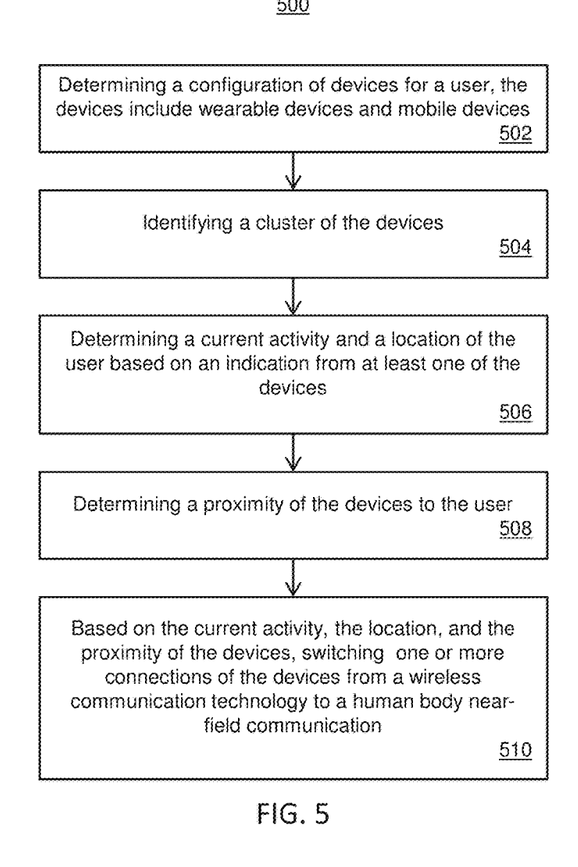
FIG. 5 is a flow diagram illustrating a method for contextually switching from a wireless communication to human body near-field communication for power savings.
Figure 6:
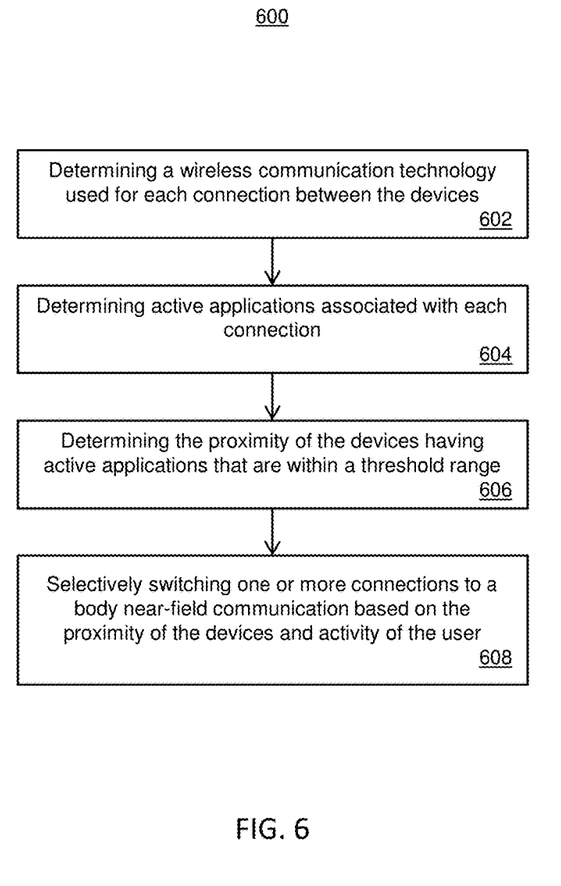
FIG. 6 is a flow diagram illustrating a method for contextually switching from a wireless communication to human body near-field communication for power savings.

In an exemplary embodiment, where the utilizing biometric emotion change for photography capture is implemented in hardware, the methods described herein, such as processes 500 and 600 of FIGS. 5 and 6, respectively, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
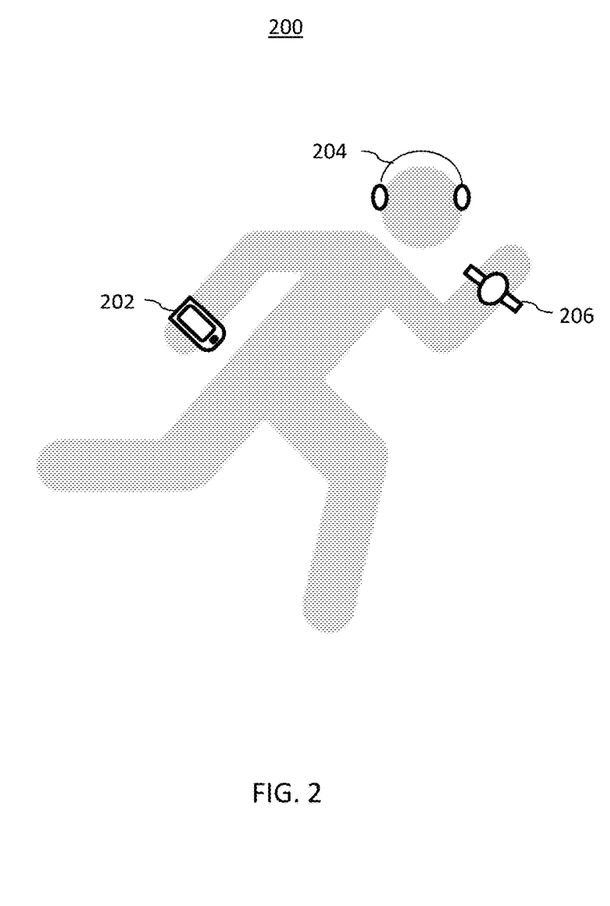
FIG. 2 is a diagram illustrating an environment for contextually switching from a wireless communication to human body near-field communication for power savings.

FIG. 2 provides a diagram 200 illustrating an environment for contextually switching from a wireless communication to human body near-field communication for power savings. A user possesses a mobile phone 202, wireless headphones 204, and a smartwatch 206. The mobile phone is configured to communicate with a cellular network, WiFi, Bluetooth, near-field communication, and other networks. The wireless headphones 204 communicate over a Bluetooth connection with the mobile phone 202. Smartwatch 206 communicates with the mobile phone 302 over a Bluetooth connection and can also communicate with the wireless headphones 204 over a Bluetooth connection. The smartwatch 206 includes sensors for detecting biometric data of the user, accelerometers, and gyroscopes for detecting motion, GPS modules tracking location, etc. The smartwatch 206 is configured to determine whether the user is wearing the smartwatch 206 based on the sensors.

In one or more embodiments, the devices are configured to communicate through a human body near-field communication network. The devices can include electrodes that make contact with the user and transmit a signal that modulates the input signal from the electrode. These devices can include high-efficiency electric field induction technology. The devices can also include receivers for demodulating signals transmitted through the human body near-field communication system. In addition, the receiver devices can include environmental noise suppression technology to filter the signal.

In an embodiment, the mobile phone 202 is a controller device. The mobile phone 202 determines the connections and associates the devices into a cluster. The mobile phone is able to determine the applications that are currently being used and are active in the system. The mobile phone 202 and/or the smartwatch 206 can determine the location of the user based on GPS signals. For example, the GPS signals can indicate the user is at the park or gym. These locations can be common places where the user performs an activity such as running. In other examples, location awareness can use GPS information and can be used to determine the set of devices are being used in a location such as a park, office, gym, car, etc. The accelerometers and gyroscopes of the mobile phone 202 and smartwatch 206 can determine an activity of the user as running based on the repetitive motion of the devices. For example, the mobile phone 202 can determine the user is running in the park using the sensors and GPS information. The computing system can store the information and recognize the configuration on a subsequent use.

The controller device can be configured to determine the proximity of the set of devices. The proximity of the mobile phone 202 to the smartwatch 206 and the wireless headphones 204 is determined to check which connections between the devices are eligible to be switched from a wireless communication to a human body near-field communication. For example, if the smartwatch 206 is not making contact with the user the connection to the mobile phone 202 cannot be switched. Also if the wireless headphones 204 were not being worn by the user the connection to the mobile phone 202 cannot be switched.

The proximity of the smartwatch 206 can be determined based on the user's wrist making contact with the sensors of the smartwatch. This indication can be transmitted to the mobile phone 202. The proximity of the wireless headphones 204 can be determined based on the signal strength of the connection between the mobile phone 202 and the wireless headphones 204 or based on the signal strength between the wireless headphones 204 and smartwatch 206. If these devices are determined to be within proximity of one another and are making contact with the user the connections are eligible to be switched.

Responsive to identifying the cluster of devices and active applications, the user activity and location, and the proximity of devices, the mobile phone as the controller device can switch one or more connections to the body near-field communication to conserve power. In one or more embodiments, the identified configurations can be updated to include other devices. For example, the user may decide to add a chest heart rate monitor that is capable of communicating with the controller device over a Bluetooth connection and human body near-field communication. The updated configuration can be used to switch the heart rate monitor to the human body near-field communication in combination with the other connections that were switched to the human body near-field communication to conserve power.

Figure 3:
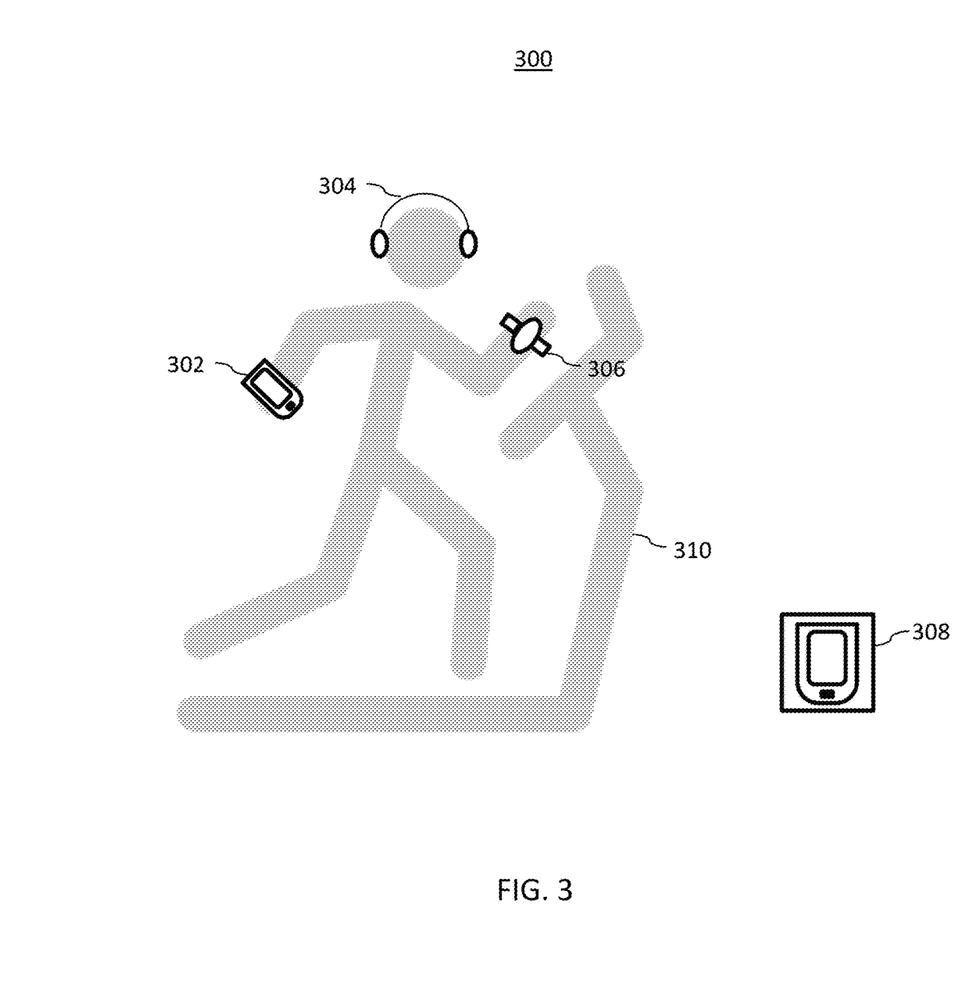
FIG. 3 is a diagram illustrating another environment for a contextually switching from a wireless communication to human body near-field communication for power savings.

Referring now to FIG. 3, a diagram 300 illustrating another environment for contextually switching from a wireless communication to human body near-field communication for power savings is shown. FIG. 3 illustrates a scenario where a user is running on a treadmill 310 at home or in a gym. In this example, the user can stream music from a home server 308 to a mobile phone 302. The connection between the mobile phone 302 and the home server 308 is a WiFi connection. The mobile phone 302 is also connected to the wireless headphones 304 and smartwatch 306 over a Bluetooth connection. The mobile phone 302 as the controlling device is configured to determine each of the connections between the devices and the devices that are included in the cluster.

The GPS modules of the mobile phone 302 and smartwatch 306 can indicate the user is located in the home office instead of the gym or park as in the previous example. The activity can be determined by the mobile phone 302 and/or smartwatch 306 as running and/or walking. In an embodiment, if the smartwatch 306 determines the activity an indication is transmitted to the mobile phone 302. Once the location and activity information is received by the mobile phone 302 the proximity of the devices are determined. In different embodiments, one or more of the GPS information can be used to indicate a proximity of the devices, the signal strength used for a connection to the controller device (mobile phone) can indicate a proximity of the devices, the biometric sensors located on the devices can be used, and the like. In another embodiment, one or more of the techniques can be combined to determine the proximity of devices.

In this example, the mobile phone 302 can switch the connection to the wireless headphones 304 and smartwatch 306 to the body near-field communication to conserve power. In one or more embodiments, the mobile phone 302 can switch the WiFi connection to the music server 308 to a Bluetooth connection which is a less power intensive connection. The mobile phone 302 is capable of analyzing the geographic location of the user, an activity of the user, proximity data of the used devices and each connection and application to determine which devices to switch. In an embodiment, the mobile phone can turn off connections that have not been active for a period of time. In this example, the mobile device selectively manages each connection based on factors to conserve power in the system.

In one or more embodiments, the computing system can switch the eligible connections based on determining the activity and/or the location. For example, if it determined the user is running the computing system can switch the eligible connections. In addition, the computing system can use both the activity and location information prior to switching the connections to ensure a higher confidence the user is using a particular configuration for an identified activity.

Figure 4:
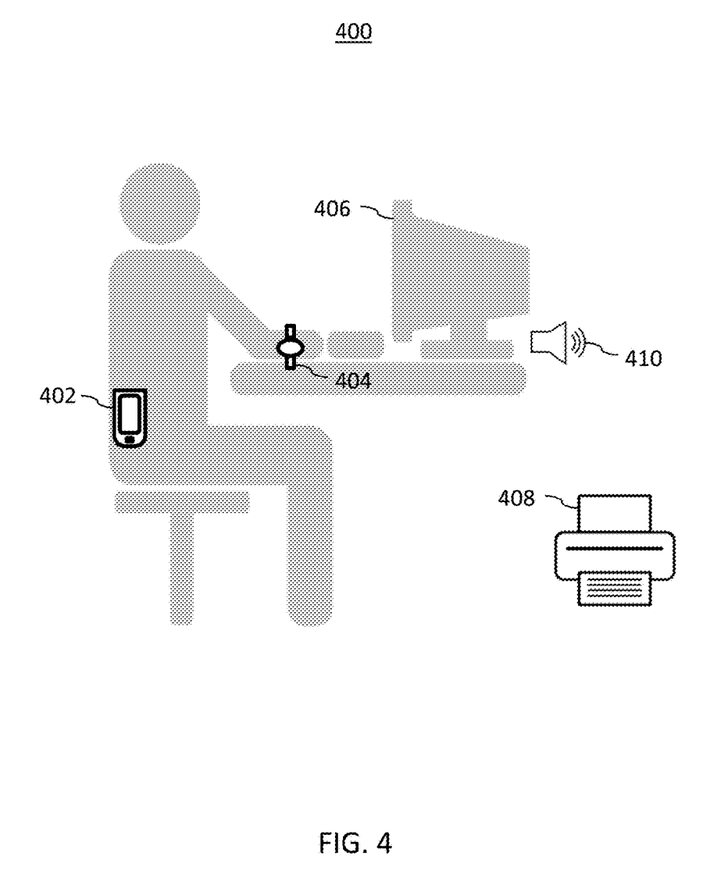
FIG. 4 is a diagram illustrating another environment for a contextually switching from a wireless communication to human body near-field communication for power savings.

Referring now to FIG. 4, a diagram 400 illustrating another environment for contextually switching from a wireless communication to human body near-field communication for power savings is shown. The user is positioned in an office workspace setting where several devices are connected to one another. A mobile phone 402 is located on the user. In addition, the user is shown wearing a smartwatch 404. The computer 406 can exchange data over Bluetooth and/or WiFi to any of the other devices that are capable of communicating over the connections. Printer 408 can be connected to the computer 406 or mobile phone 402 over a Bluetooth connection. Similarly, speaker 410 is a Bluetooth-connected speaker that can be connected to the mobile phone 402 or computer 406.

In the office environment, the mobile device 402 is the controller device and can recognize the combination of connections that are paired with the devices. In this configuration, because minimal activity is detected by the mobile phone 402 and/or smartwatch 404, the mobile phone 402 can determine which connections selectively switch from a power intensive connection to a less power intensive connection. For example, the mobile phone 402 can switch the connection with the smartwatch 404 to the near-field communication. In addition, the mobile phone 402 can turn off the Bluetooth connection with the printer 408 and Bluetooth speaker 410. As an example, the mobile phone 402 can learn from previous instances of the office space environment that the mobile phone 402 is not used for printing or for playing audio over the Bluetooth speaker 410.

The mobile phone 402 determines the connection of each device and the type of connections. Next, the mobile phone 402 can determine the applications that are currently running and active for each device. For example, a health application on the smartwatch 404 can be exchanging information with the mobile phone 402 such as physiological data while the printer 408 is not active. In one instance, the user may decide to use the computer 406 for all printing needs and not the mobile phone 402 which is paired to the wireless printer 408 over a Bluetooth connection when the user is located in his office.

Next, the mobile device 402 can determine the proximity of the devices. In this example, the GPS module of the mobile phone 402 can indicate to the user a location. The GPS module can indicate the user is located within his home or more precisely the office of his home. In another example, the location can be determined based on which access points or routers the mobile phone is connected to. The system can associate the activity of office work or business work given the location of the mobile phone 402 as the controller device. In addition, the mobile phone 402 can determine the smartwatch 404 is within proximity of the user using the sensors of the smartwatch 404. The mobile phone 402 can determine the proximity of the wireless printer 408 based on the signal strength of the wireless printer 408 and the mobile phone 402. The mobile phone 402 can store this configuration and can automatically switch the connections based on the detected activity and proximity of the devices.

After the mobile phone 402 has identified the cluster of devices, the activity and location of the user, and the proximity of each device in the cluster, the mobile phone 402 can switch the Bluetooth connection from the mobile phone 402 to the smartwatch 404 to use the human near-field body area network and turn off the inactive Bluetooth connection to the printer 408. The mobile phone 402 can maintain a WiFi connection to a home network and/or the cellular service to meet the other needs of the mobile phone 402. By switching connections and turning off other connections the power of the mobile phone 402 and other devices can be conserved.

In one or more embodiments, the mobile phone 402 can switch the devices to a default position once determining an activity has ceased for a period of time. This can be determined by learning the user has left the office for a period of time-based on a GPS signal or by determining the different types of applications are running.

FIG. 5 illustrates a method 500 for contextually switching from a wireless communication to human body near-field communication for power savings is shown. Block 502 provides determining a configuration of devices, the devices include wearable devices and mobile devices. In an example, a controller device such as a mobile phone is capable of determining each device it is connected to and the type of connections being used. The type of connections includes WiFi, Bluetooth, NFC, etc. The controller device can also determine the applications that are being used for each device. Active applications are those that are currently being used. For example, a mobile phone that is streaming audio to wireless headphones is considered active while a mobile phone that is connected to a wireless printer would not necessarily be considered active unless a print command was recently transmitted to the printer or the printer is currently printing. In other words, applications are not considered active simply because they are open on a device but based on the recent utilization of the application. In a scenario where the mobile phone is connected to the wireless headphones and the wireless printer, the streaming application is considered to be active while the printing application is considered idle, stale, or inactive.

At block 504, the method 500 includes identifying a cluster of the devices. A cluster of devices can be a subset of the devices determined in the configuration. The cluster includes devices that are paired or connected to each other and are currently active. For example, a mobile phone that is connected to both a smartwatch and wireless headphones can be considered a cluster. However, if the wireless printer is connected to the mobile phone and is not actively printing, the wireless printer would not be considered part of the cluster of devices.

Block 506 provides determining a current activity and a location of the user based on an indication from at least one of the devices. The current activity of the user includes examples such as walking, running, working, etc. The current activity can be detected by sensors of the devices such as gyroscopes and accelerometers. The sensors can detect patterns of movements that indicate the user is performing a particular activity. For example, smartwatches are equipped with sensors to determine when a user is running, walking, hiking, cycling, amongst many other activities. This information can be transmitted from such devices to a controller device.

Block 508 provides determining a proximity of the devices to the user. The proximity of the devices to the body of the user can be determined in a variety of ways. For example, biometric sensors can determine if devices are making contact with a user, signal strength information for each connection can be correlated to a distance, GPS information can indicate a location of a device, amongst others techniques.

Block 510 provides based on the current activity, the location, and the proximity of the devices to the user, switching one or more connections of the devices from a wireless communication technology to a human body near-field communication technology. In an embodiment, each connection is independently switched based on several factors.

In one or more embodiments, the configurations are stored and used when a controlling device detects a previously used context (activity, cluster, proximity, location). For example, the controlling device can determine the user is located in a park and streaming audio music to wireless headphones and connected to a smartwatch running a health tracking application. In an embodiment, the configurations can be updated to include new devices or remove old devices. In the previous example, the user may decide not to wear a smartwatch but instead wear electronic textile clothing to relay data to the mobile device. The stored data can be updated to reflect a new configuration or pattern based on the modified configuration.

FIG. 6 is a method 600 for contextually switching from a wireless communication to human body near-field communication for power savings. Block 602 provides determining a wireless communication technology used for each connection between the devices. In an example, a controller can determine each device that it is connected to and the type of wireless communication technology being used for each connection. For example, a connection to a first device can include a WiFi connection, a second connection can include a Bluetooth connection, and another connection can include a near-field communication connection. In a scenario, a mobile phone is the controller device and manages each of the connections.

Block 604 provides determining active applications associated with each connection. In one or more embodiments, each connection that is not being used for an active application can be disabled to conserve power. For example, a Bluetooth speaker that is not currently receiving audio data from a music or audio application of a mobile phone/device can have the Bluetooth connection disabled.

Block 606 provides determining the proximity of the devices having active applications that are within a threshold range. In one or more embodiments, the threshold range is a configurable threshold range or a threshold based on one or more previous occurrences for a measured signal strength. For example, in one or more instances, a cluster of devices can include a mobile phone and wireless headphones where the communication occurs over a Bluetooth connection. The system can measure the signal strength associated with the connection and correlate the signal strength with a distance between the devices. That signal strength can be subsequently used to determine a proximity of the device to the user based on a previous configuration. In one example, the threshold can be the average signal strength two or more previous connection. If it is determined the device is within a certain distance based on the current measured signal strength, the connection is eligible to be switched.

Block 608 provides selectively switching one or more connections to a near-field communication based on the proximity of the devices and activity of the user. In one or more embodiments, the controller can be made aware of the capabilities of the connected devices to use different wireless communication technologies. In the event the connected devices are not capable of communicating over a wireless technology, the connection will not be switched. For example, if a device is not capable of communicating over a near-field communication the connection for that device is not eligible and will not be switched to use the human body near-field communication. However, a WiFi connection can be switched to a Bluetooth connection if eligible.

The techniques described provides a computing system capable of learning a pattern of use for a set of devices and selectively switching connections based on the learned pattern. A pattern can be established based on one or more instances having been used. Each instance of a combination of the devices can be stored by the computing system and updated as users continue to develop the cluster of devices. The information stored for each instance includes the devices associated with the cluster, active applications, location of the user, and proximity of the devices. In another embodiment, other information can be tracked to optimize the settings for switching the connection to a different technology. In one or more embodiments, one or a combination of the above factors can be used to determine when a connection is to be switched.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for contextually switching from a wireless communication to human body near-field communication for power savings, the method comprising:
   determining, via a processor, a configuration of devices for a user, the devices include wearable devices and mobile devices;
   identifying a cluster of the devices, wherein the cluster of the devices are paired to each other and have active applications, wherein the cluster of the devices include three or more devices;
   determining a current activity and a location of the user based on an indication from at least one of the devices;
   determining a proximity of the devices to the user;
   switching one or more connections of the wearable devices and the mobile devices from a wireless communication technology to a human body near-field communication based on the current activity, the location of the user, and the proximity of the devices, wherein each of the one or more connections of the cluster of devices is switched selectively and independently of the other devices of the cluster to the human body near-field communication; and
   storing the configuration and the activity of the user.

2. The method of claim 1, further comprises determining the wireless communication technology used for each connection between the devices;
   determining active applications associated with each connection;
   determining the proximity of the devices having active applications that are within a threshold range; and
   selectively switching one or more connections to a human body near-field communication based on the proximity of the devices and activity of the user.

3. The method of claim 1, wherein the proximity is based on at least one of a location awareness, a signal strength of each connection, and sensor data indicating contact with the user.

4. The method of claim 2, wherein the threshold range is based on a signal strength between the wearable devices and the mobile devices, the threshold range is defined by at least one of the user and learned based on historical instances.

5. The method of claim 1, wherein the activity of the user is determined by sensor data from the wearable devices and the mobile devices.

6. A system for contextually switching from a wireless communication to human body near-field communication for power savings, the system comprising:
   a storage medium, the storage medium being coupled to a processor;
   the processor configured to:
      determine a configuration of devices for a user, the devices include wearable devices and mobile devices;
      identify a cluster of the devices, wherein the cluster of the devices are paired to each other and have active applications, wherein the clusters of the devices include three or more devices;
      determine a current activity and a location of the user based on an indication from at least one of the devices;
      determine a proximity of the devices to the user;

switch one or more connections of the wearable devices and the mobile devices from a wireless communication technology to a human body near-field communication based on the current activity, the location of the user, and the proximity of the devices, wherein each of the one or more connections of the cluster of the devices is switched selectively and independently of the other devices of the cluster to the human body near-field communication; and store the configuration and the activity of the user.

7. The system of claim 6, further comprising the processor configured to determine the wireless communication technology used for each connection between the devices;

determine active applications associated with each connection;

determine the proximity of the devices having active applications that are within a threshold range; and selectively switch one or more connections to a human body near-field communication based on the proximity of the devices and activity of the user.

8. The system of claim 6, wherein the proximity is based on at least one of a location awareness, a signal strength of each connection, and sensor data indicating contact with the user.

9. The system of claim 7, wherein the threshold range is based on a signal strength between the wearable devices and the mobile devices, the threshold range is defined by at least one of the user and learned based on historical instances.

10. The system of claim 6, wherein the activity of the user is determined by sensor data from the wearable devices and the mobile devices.

11. A computer program product for contextually switching from a wireless communication to human body near-field communication for power savings, the computer program product comprising:

a computer readable storage medium having stored thereon first program instructions executable by a processor to cause the processor to:

determine a configuration of devices for a user, the devices include wearable devices and mobile devices;

identify a cluster of the devices, wherein the cluster of the devices are paired to each other and have active applications, wherein the clusters of the devices include three or more devices;

determine a current activity and a location of the user based on an indication from at least one of the devices;

determine a proximity of the devices to the user;

switch one or more connections of the wearable devices and the mobile devices from a wireless communication technology to a human body near-field communication based on the current activity, the location of the user, and the proximity of the devices, wherein each of the one or more connections of the cluster of the devices is switched selectively and independently of the other devices of the cluster to the human body near-field communication; and store the configuration and the activity of the user.

12. The computer program product of claim 11, wherein the instructions are further executable by the processor to cause the processor to determine the wireless communication technology used for each connection between the devices;

determine active applications associated with each connection;

determine the proximity of the devices having active applications that are within a threshold range; and selectively switch one or more connections to a human body near-field communication based on the proximity of the devices and activity of the user.

13. The computer program product of claim 11, wherein the proximity is based on at least one of a location awareness, a signal strength of each connection, and sensor data indicating contact with the user.

14. The computer program produce of claim 12, wherein the threshold range is based on a signal strength between the wearable devices and the mobile devices, the threshold range is defined by at least one of the user and learned based on historical instances.

15. The computer program product of claim 11, wherein the activity of the user is determined by sensor data from the wearable devices and the mobile devices.

* * * * *